US006618824B1

(12) United States Patent
Hastings (10) Patent No.: US 6,618,824 B1
(45) Date of Patent: *Sep. 9, 2003

(54) METHOD AND APPARATUS FOR MODIFYING RELOCATABLE OBJECT CODE FILES AND MONITORING PROGRAMS

(75) Inventor: Reed Hastings, La Honda, CA (US)

(73) Assignee: Rational Software Corporation, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/434,203

(22) Filed: Nov. 4, 1999

Related U.S. Application Data (63) Continuation of application No. 08/455,821, filed on May 31, 1995, now Pat. No. 6,206,584, which is a division of application No. 08/452,452, filed on May 26, 1995, now Pat. No. 5,535,329, which is a division of application No. 07/970,315, filed on Nov. 2, 1992, now Pat. No. 5,335,344, which is a continuation of application No. 07/718,573, filed on Jun. 21, 1991, now Pat. No. 5,193,180.

(51) Int. Cl.$^7$ ............................................... G06F 11/00
(52) U.S. Cl. ............................................................ 714/35
(58) Field of Search .............................. 714/35; 717/162, 717/124; 712/226; 709/315, 331, 332

(56) References Cited

U.S. PATENT DOCUMENTS

| | | | |
|---|---|---|---|
| 3,815,103 A | 6/1974 | Holtley et al. | 340/172.5 |
| 4,104,718 A | 8/1978 | Poublan et al. | 364/200 |
| 4,394,731 A | 7/1983 | Flusche et al. | 395/472 |
| 4,533,997 A | 8/1985 | Furgerson | 385/425 |
| 4,802,165 A | 1/1989 | Ream | 371/19 |
| 4,811,347 A | 3/1989 | Bolt | 371/51 |
| 4,815,025 A | 3/1989 | Ossfeldt et al. | 364/900 |
| 4,903,194 A | 2/1990 | Houdek et al. | 364/200 |
| 4,937,736 A | 6/1990 | Chang et al. | 364/200 |
| 4,953,084 A | 8/1990 | Meloy et al. | 364/200 |
| 5,025,366 A | 6/1991 | Baror | 364/200 |
| 5,029,078 A | 7/1991 | Iwai | 364/200 |
| 5,075,842 A | 12/1991 | Lai | 395/425 |

(List continued on next page.)

FOREIGN PATENT DOCUMENTS

EP 0496494 7/1992

OTHER PUBLICATIONS

Austin et al., "Efficient detection of all pointer and array access errors" 1993, Computer Sciences Dept., Univ. of Wisconsin–Madison, pp. 1–29.

Larus et al., "Rewriting executable files to measure program behavior", 1992, Computer Sciences Dept., Univ. of Wisconsin–Madison, pp.1–17.

Calliss et al., "Dynamic data flow analysis of C programs" 1988, Proc. Of 21$^{st}$ Ann. Hawaii Inter. Conf. On Sys. Sci., vol. II, IEEE, pp. 514–523.

(List continued on next page.)

*Primary Examiner*—Scott T. Baderman
(74) *Attorney, Agent, or Firm*—Ritter, Lang & Kaplan LLP (57) ABSTRACT

An object code expansion program inserts new instructions and data between preexisting instructions and date of an object code file; offsets are modified to reflect new positions of the preexisting instructions and data. For each item of preexisting object code (instructions or data), the following steps are performed: making a new code block comprising any desired new instructions and the item, and storing it as new object code; tracking the location of the item and the new code block within the new object code; and tracking items that contain inter-item offsets. Then, each inter-item offset is updated using the new location of the item or new code block, as required. Finally, offsets in symbol tables and relocation structures are updated with the new location of the item.

5 Claims, 8 Drawing Sheets

Microfiche Appendix Included
(2 Microfiche, 88 Pages)

U.S. PATENT DOCUMENTS

| | | | |
|---|---|---|---|
| 5,115,499 A | 5/1992 | Stiffler et al. | 395/425 |
| 5,132,972 A | 7/1992 | Hansen | 371/19 |
| 5,175,837 A | 12/1992 | Arnold et al. | 395/425 |
| 5,193,180 A | 3/1993 | Hastings | 395/375 |
| 5,230,070 A | 7/1993 | Liu | 395/425 |
| 5,335,344 A | 8/1994 | Hastings | 395/375 |
| 5,404,499 A | 4/1995 | Nichols | 364/266 |
| 5,412,788 A | 5/1995 | Collins et al. | 395/425 |
| 5,438,670 A | 8/1995 | Baror et al. | 395/403 |
| 5,528,753 A | 6/1996 | Fortin | 395/183.11 |
| 5,535,329 A * | 7/1996 | Hastings | 714/35 |
| 5,835,701 A * | 11/1998 | Hastings | 714/35 |
| 6,206,584 B1 * | 3/2001 | Hastings | 714/35 |

OTHER PUBLICATIONS

Egan, "Achieving supercomputer performance in a low pain environment", 1990, COMPCON Spring '90, IEEE, pp. 205–207.

"Using Saber–C", Saber Software, Inc., Cambridge, Massachusetts 02138.

"Saber–C Reference", Saber Software, Inc., Cambridge Massachusetts 02138.

Graham et al., "Practical data breakpoints: Design and implementation" 1993, Computer Science Div., UC Berkeley, pp. 1–13.

Chow et al., "Engineering a RISC compiler system", 1986, MIPS Computer Systems, IEEE., pp. 132–137.

Borg et al., "Long address traces from RISC machines: Generation and analysis", 1989, Western Research Laboratory.

Goldberg et al., "MTOOL: A method for detecting memory bottle–necks", 1990, Western Research Laboratory.

McFarling, "Program organization for instruction caches", 1989, Computer Systems Laboratory, Stanford University.

"RISCCompiler and C programmer's guide", 1989, MIPS Computer Systems, Inc.

Wall, "Global register allocation at link time", 1986, Western Research Laboratory.

Wall, "Link–time code modification", 1989, Western Research Laboratory.

Wall et all, "The Mahler experience: Using an intermediate language as the machine description", 1987, Western Research Laboratory.

Wall, "Register windows Vs. register allocation", 1987, Western Research Laboratory.

Wahbe et al., "Low latency RPC via software—enforced protection domains", 1993, Computer Science Div., UC Berkeleky.

Wahbe, "Efficient data breakpoints", 1992, UC Berkeley, pp. 200–209.

Wall, "Systems for late code modification", 1992, DEC Western Research Laboratory, (C00093).

Wall, "Post compiler code transformation", 1992, DEC Western Research Laboratory, (C00011).

Hastings et al., "Purify: Fast detection of memory leaks and access errors", 1992, Proceedings of the Winter USENIX Conference, pp. 125–136.

"The safe C runtime analyzer", pre–1991, Product description and manual pages, Blossom/Catalyix, Cambridge, Massachusetts.

Feuer, "SI–AN Interpreter for the C language", 1985, USE–NIX Conference Proceedings, pp. 47–55.

Kaufer et al., "Saber C, an interpreter–based programming environment for the C language", 1988, Summer USENEX —San Francisco, CA, pp. 47–55.

Kessler, "Fast breakpoint: design and implementation", 1990, Proceeding of the ACM SIGPLAN '90, White Plains, New York, pp. 78–84.

Johnson, "Postloading for fun and profit", 1990, USENIX, pp. 325–330.

Bishop, "Profiling under UNIX by patching", 1987, Software Practice and Experience, vol. 17, No. 10, pp. 729–739.

Mellor–Crummey et al., "A software instruction counter", 1989, Sigplan Notices, vol. 24, pp. 78–86.

Ferrari, "Computer systems performance evaluation", 1978, Englewood Cliffs, New Jersey, pp. 44–56.

Evans et al., "Debug–an extension to current on–line debugging techniques", 1965, Comm. Of ACM, vol. 8, No. 5. pp. 321–326.

Smith, "Tracing with pixie", UNIX man pages, pp. 1–2.

May, "MIMIC: A fast system/370 simulator", 1987, ACM Sigplan Notices, vol. 22, No. 7, pp. 1–13.

Boothe, "Fast accurate simulation of large shared memory multi–processors", 1988, US Berkeley EECS Rpt. No. UCB/CDS 92/682.

Gray Watson, Debug Malloc Library, 1997, Debug–Malloc Home Page at http://www.letters.com/dmalloc/.

Ward, "Wired C Bugs" 1988, Computer Language, pp. 63–66.

Merilatt, "C dynamic memory use", 1989, Dr. Dobb's Journal, pp. 62, 64, 66–67, 125.

Anderson, "C customized memory allocators ", Winter 1989/1990, Dr. Dobb's C Sourcebook, pp. 62–66, 94.

Kempton et al., "Run–time detection of undefined variables considered essential", 1990, Software–Practice and Experience, vol. 20 (4), pp. 391–402.

Johnson, "An annotated software debugging bibliography", 1982, Hewlett–Packard CSL 82–4.

Fox, "Dynamic memory management in C", 1988, BYTE, pp. 313–314, 316, 318.

Heller, "Just add water" 1990, BYTE, pp. 180, 190, 314, 316, 318.

Pearson, "Array bounds checking with turbo C", 1991, Dr. Dobb's Journal, pp. 72–74, 78–82, 104.

Thompson, "Error checking, tracing, and dumping in an ALGOL 68 checkout compiler" 1977, Sigplan Notices, pp. 106–111.

Steffen, "Adding run–time checking to the portable C compiler", 1992, Software–Practice and Experience, vol. 22(4), pp. 305–316.

Welsh, "Ecomonic range checks in PASCAL1", 1978, Software–Practice and Experience, vol. 8, pp. 85–97.

Zelkowitz et al., "Error checking with pointer variables", 1976, Proceedings of the ACM 1976 National Conference, pp. 391–395.

Delisle et al., "Viewing a programming environment as a single tool", 1984, ACM Sigplan Notices, vol. 19(5), pp. 49–56.

Ross, "Integral C–A practical environment for C programming" 1986, ACM Sigplan Notices, vol. 22(1), pp. 42–48.

Fischer, "The implementation of run–time diagnostics in PASCAL1" 1980, IEEE Transactions on Software Engineering, vol. SE–6, No. 4, pp. 313–319.

Winner, "Unassigned objects", 1984, ACM Transaction on Programming Languages and Systems, vol. 6, No. 4, pp. 449–467.

Chase et al., "Selective interpretation as a technique for de–bugging computationally intensive programs" 1987, ACM Sigplan Notices, vol. 22(7), pp. 113–124.

Deutsch et al., "A flexible measurement tool for software systems", 1971, Proc. Of IFIP Congress, pp. TA–3–7 to TA–3–12.

Grossman, "Debugging with the 80386", 1988, Dr. Dobb's Journal, pp. 18, 20,24,26,28.

Sato et al., "Run–time checking in LISP by integrating memory addressing and range checking", 1989, ACM Pub. No. 0884–7495/89/0000/0290, pp. 290–297.

Stucki, "A prototype automatic program testing tool" 1972, AFIPS Fall Joint Computer Conference, pp. 829–836.

Stucki et al., "New assertion concepts for self–metric software validation", 1975, Sigplan Notices 10(6), pp. 59–65.

Goldberg, "Reducing overhead in counter–based execution profiling", Stanford Technical Report No. CSL–TR–91–495.

Manmood et al., "Concurrent error detection using watchdog processors —A survey", 1988, IEEE Transactions on Computers, vol. 37, No. 2, pp. 160–174.

Feustel, "On the advantages of tagged architecture", 1973, IEEE Transactions on Computers, vol. C–22, No. 7, pp. 644–656.

Deutsch et al., "A flexible measurement tool for software systems", 1971, Proc. Of IFIP Congress, pp. TA–3–7 to TA–3–12.

Osterweil et al., "DAVE–A validation error detection and documentation system for FORTRAN programs", 1976, Software–Practice and Experience, vol. 6, No. 4, pp. 473–486.

Huang, "Detection of data flow anomaly through program instrumentation", 1979, IEEE Transactions on Software Engineering, vol. SE–5, No. 3, pp. 226–236.

Wilson et al., "Omega —A data flow analysis tool for the C programming language", 1985, IEEE Transactions on Software Engineering, vol. SE–11, No. 9, pp. 832–838.

Huang, "Program instrumentation and software testing", 1978, Computer, vol. 11, pp. 25–32.

Aral et al., "Efficient debugging primitives for multiprocessors", 1989, Encor Computer Corporation, ASPLOS III Proceedings, Sigplan Notices, vol. 24, pp. 87–93.

Caplinger, "A memory allocator with garbage collection for C", 1988, USENIX Winter Conf., pp. 325–330.

Eggers et al., "Techniques for efficient inline tracing on a shared–memory multiprocessor", 1989, Univ. of Washington at Seattle, pp. 1–19.

Evans et al., "On–line debugging techniques: A survey", 1966, Proceedings —Fall Joint Computer Conference, pp. 37–50.

Fabry, "Madbug —A mad debugging system", 1965, Compatible Time–Sharing System, A Programmer's Guide, 2d Ed., MIT, pp. 1–14.

Fischer et al., "Efficient implementation and optimization of run–time checking in PASCAL", 1976, Computer Science Dept., Univ. of Wisconsin, pp. 19–24.

Gill, "The diagnosis of mistakes in programmes on the EDSAC", 1951, Proceedings of the Royal Society, Series A Math and Physical Sci., No. 1087, vol. 206, pp. 538–554.

Kendall, "Runtime checking for C programs", 1983, USENIX Software Tools, Toronto Conference Proceedings, pp. 6–16.

Nichols, "The bug stops here", 1989, Electronic Design, pp. 84–90.

Snodgrass, "Monitoring in a software development environment: A relational approach", 1984, Assoc. for Computing Mach.

Stephens et al., "Instructions level profiling and evaluation of the IMB RS/6000", 1991, Assoc. for Computing Mach., ACM 0–89791–394–9/91/0005/0180, pp. 180–189.

* cited by examiner

METHOD AND APPARATUS FOR MODIFYING RELOCATABLE OBJECT CODE FILES AND MONITORING PROGRAMS

This application is a continuation of U.S. application Ser. No. 08/455,821, filed May 31, 1995, now U.S. Pat. No. 6,206,584, which is a division of U.S. application Ser. No. 08/452,452, filed May 26, 1995, now U.S. Pat. No. 5,535,329, which is a division of U.S. application Ser. No. 07/970,315, filed Nov. 2, 1992, now U.S. Pat. No. 5,335,344, which is a continuation of U.S. application Ser. No. 07/718,573, filed Jun. 21, 1991, now U.S. Pat. No. 5,193,180.

SOURCE CODE APPENDIX

A microfiche appendix of c language source code for the preferred embodiment (©1991 Reed Hastings) is filed herewith consisting of 2 sheets of microfiche and 88 frames. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to a method and apparatus for modifying relocatable object files. In particular, the present invention relates to a method for inserting additional instructions and data into an existing relocatable object file of a computer program, for any purpose. Most particularly, this purpose is to monitor memory access by the computer program.

Despite the recent increase in CPU speeds and software complexity, most programmers continue to rely on development tools that were designed over fifteen years ago and that have not changed significantly since then. These development tools have serious inadequacies that exacerbate the difficulties of developing large, complex programs.

Problems with developing applications in C/C++ are often more serious than with other programming languages, but are fairly typical. C/C++'s pointer and memory management facilities make it difficult to build large, robust programs. Prudent C/C++ programmers currently hesitate to use many commercial object code libraries because they are worried they may lose weeks of time later on in tracking down wild-pointer bugs introduced by their particular use of a given library. The difficulty in tracking down these kinds of programming bugs and many others is directly tied to the manner in which executable code is created from source code and to the inadequacies of current development tools.

The process of transforming source code into "executable" code is, briefly, as follows. The source code for a typical computer program is divided into many files. Some of these files may contain high-level language code, such as C, C++, Pascal, Fortran, Ada, or PL1, and some may contain assembly language code. Each high-level language file is translated by a language-specific compiler into either a relocatable object file, or into an assembly language file. An assembler translates the assembly language files into relocatable object files. A linker merges all of the relocatable object files into a single executable program.

As programs get larger and more complex, they become more difficult to test and debug. If one wants to monitor or analyze aspects of a program's behavior, the current practice is to have the compiler output the extra instructions required to implement the desired monitoring. One example of this exists in many Pascal compilers; there is typically a way to request the compiler to output the extra instructions required to check array bounds at run time, and to signal an error if there is a violation. Another example exists in many Unix/C compilers; most compilers will, upon request, output extra instructions to record how many times each function was called.

The approach of having the compiler output the extra instructions required to implement a monitoring or analysis scheme is, however, flawed in at least three significant ways: First, modifying the compiler to output new sequences is difficult, and in practice, nearly impossible, because most programmers don't have the source code to the compiler. Second, recompiling all of a program's files just to get the extra instructions inserted can be very time consuming and wasteful. Finally, not all code goes through a compiler; some is written in assembly language and does not get the new instructions inserted into it. Thus, any monitoring which requires complete coverage to work correctly cannot be implemented through only the compiler.

Some of the most vicious development problems relate to the difficulty in finding and eliminating a large class of memory-access related errors. Among the most important memory-access related errors that a programmer needs to detect are array bounds violations, uninitialized memory reads, free memory access, and data changing strangely.

Array bounds violations (where an array is any collection of data contiguous in memory) occur on those occasions when a program reads or writes past the end, or before the beginning, of an array and accesses whatever datum happens to be in that memory location.

Uninitialized memory reads happen when a program allocates some memory for data storage, but fails to initialize it completely. Later, an uninitialized portion is read, unintentionally providing a random value, which might sometimes cause to the program to fail, and sometimes not.

Free memory access describes the situation where a program deallocates some memory but incorrectly continues to use it. If the program reallocates that memory for another purpose, then it will be using the same memory for two different purposes, and the program will probably perform incorrectly.

"Data changing strangely" is a bit of a catch-all expression. Often there are many ways to change a datum, especially a "global" datum. The programmer can have a difficult time discovering which function is changing the datum incorrectly, in a given run of the program. What the programmer needs is to have a monitoring program tell him or her whenever a specified datum changes (this is called a watchpoint).

A comprehensive way to monitor the execution of today's and tomorrow's programs, in particular their memory access, is clearly needed by the program developer.

SUMMARY OF THE INVENTION

According to one aspect of the invention, an object code file is expanded by inserting additional instructions and/or data between preexisting instructions and data, which may also be modified in some ways. A basically unlimited variety of additional instructions and data can be inserted for an equally wide variety of purposes. After the insertion step, the offsets in the file are checked and modified, if necessary, to reflect the new positions of the preexisting instructions and data, so that the expanded code will execute properly. In the preferred embodiment additional offsets in symbol tables, data relocation tables and instruction relocation tables are updated in the same general manner as the other offsets. The basic method is as follows:

An old object code table is formed in memory space, containing the preexisting instructions and data. Space is also allocated for other tables; a new object code table, an inter-item offset table, a forward index table, and a forward control index table. For each item in the old object code table (whether instruction or datum), the following four steps are performed: (1) making a new code block comprising any desired additional instructions and/or data and the item, and storing it into the new object code table; (2) storing the location of the item within the new object code table into the forward index table; (3) storing the location of the new code block within the new object code table into the forward control index table; and (4), for items that contain inter-item offsets, storing the location within the old object code table, of the offset and the base from which it is measured, into the inter-item offset table. Then, for each pair of offset/base locations in the inter-item offset table, the offset stored in the new object code table is updated using the index tables. Finally, the offsets in any symbol tables, instruction relocation structures, or data relocation structures in the old object code file are updated so that the new offset refers to the location in the new object code table to where the item referred to was moved.

According to a second aspect of the invention, all or substantially all the memory accesses of a given program are monitored (not including the memory accesses for instruction fetch), for the purposes of performing error-checking. In one embodiment, all the object code files for an executable program are processed, and instructions are added to implement the following monitoring scheme. A memory status array is established, with an entry for most memory locations that are validly accessible by the program. Each entry indicates the state of the corresponding memory location, and the state can be one of the following three: unallocated and uninitialized, allocated but uninitialized, and allocated and initialized. Before each preexisting instruction which accesses memory or which can change memory status, extra instructions are added to maintain the memory status array, and to use the memory status array to check for the errors of writing to unallocated memory and reading from unallocated or uninitialized memory. In one particular embodiment, the data sections of the object code files are expanded with extra dummy entries between each datum. These extra entries are assigned the status of unallocated and uninitialized, and aid in the detection of array bounds violations and similar data errors. In another particular embodiment, a list is stored of memory or datum locations which are to be watchpoints with which more comprehensive monitoring is to be performed.

A further understanding of the nature and advantages of the invention may be realized by reference to the remaining portions of the specification and the drawings.

DESCRIPTION OF THE PREFERRED EMBODIMENT

This description is sufficiently detailed for an understanding of the invention, but for those interested in more details of implementation, a microfiche appendix containing the source code for the preferred embodiment is attached and references to specific portions within it are provided.

Arbitrary Instruction Insertion

Figure 1:
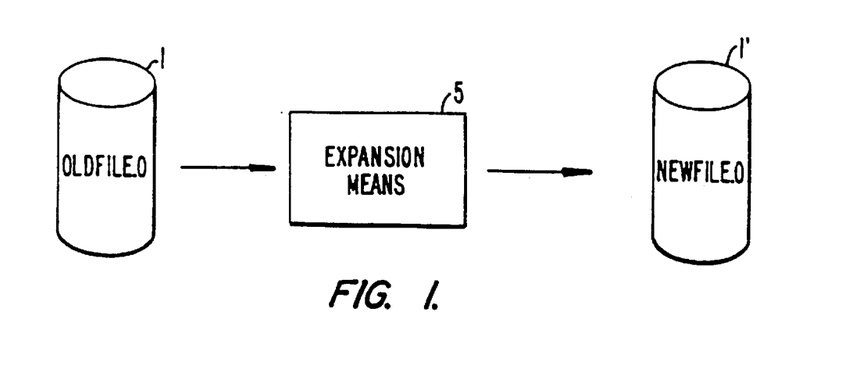
FIG. 1 is a block diagram a relocatable object file being expanded by an embodiment of the invention into a new relocatable object file.

One aspect of the present invention is a method for expanding a relocatable object file, typically by inserting new instructions and data between preexisting instructions and data of the file, without recompilation being necessary. FIG. 1 illustrates a preexisting object code file 1 ("oldfile.o") being augmented by expansion means 5 to form a new object code file 1' ("newfile-o"). In the preferred embodiment, expansion means 5 is a general purpose computer having a memory and operating under the control of a computer program. Since expansion means 5 takes object files as input, monitoring schemes can be comprehensive; the method can be applied to all code that goes into the final executable product, not just those portions for which source code is available.

Figure 2:
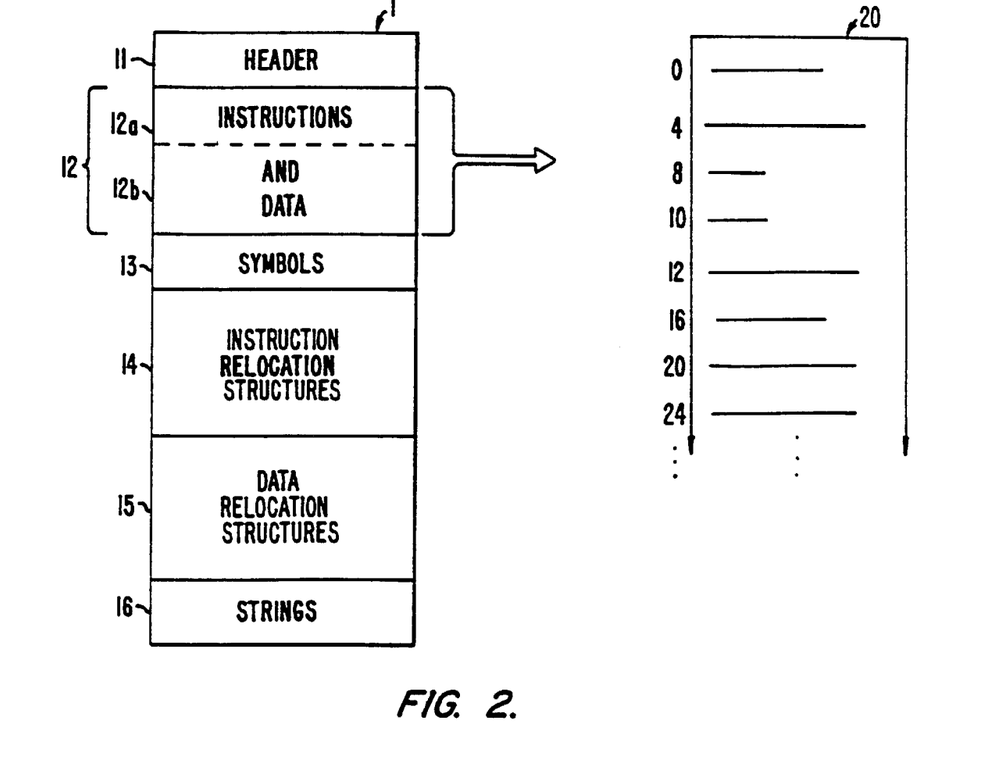
FIG. 2 is a block diagram showing the relationship between a relocatable object file and an old object code table.

The particular embodiment of expansion means 5 described herebelow is designed for a Sun3/60 running Sun OS 4.1.1, using the C/C++ compilers available from Sun Microsystems, Inc., of Mountain View, Calif., so the description is particular in some respects to that system. In that system, a standard format for relocatable object file 1 (.o file) has 7 parts, as shown in FIG. 2:

- A 32 byte header 11, which describes the lengths of the other parts.
- Binary machine instructions 12a.
- Binary data 12b.
- Symbols 13, which have a name (an index into the string section), a type, a value, and other minor fields.
- Instruction relocation data structures 14, which specify which bytes in the instruction section are unresolved references to other data or functions.
- Data relocation data structures 15, which specify which bytes in the data section are unresolved references to other data or functions.
- Strings 16, the names of the symbols.

The pre-existing instructions will generally contain many references to other instructions in terms of offsets; that is, in terms of the number of bytes separating the instructions in the object code file. When new instructions are inserted into the code, these offsets are corrected by expansion means 5. Simply modifying instructions, as opposed to adding new ones, may lengthen or shorten the instruction and also require offsets to be corrected. Furthermore, the instructions, symbols, and relocation structures also contain references to data and instructions, and these references will often be in the form of an offset from the beginning of the object file section which contains the data and instructions. These are updated in a similar manner.

The value field of certain symbols is an offset into the preexisting instructions and data, and thus must be replaced with the offset of the location to which the preexisting item has been forwarded. The symbols that need updating are those whose type field is one of: N_TEXT, N_BSS, N_DATA, N_STSSYM, N_LCSYM, N_SO, N_SOL, N_ENTRY, N_LBRAC, N_RBRAC AND N_ECOMM. These symbol types are defined in the Sun-supplied include file /usr/include/stab.h (in which "text" generally refers to instructions). Relocation structures have a field named "r_address" which (like the value field of symbols) is an offset into the preexisting instructions and data and must be updated with the new location to where the bytes originally pointed to have been moved. In addition, for local relocations, the bytes pointed to by the "r_address" field are themselves an offset that must be updated.

The extra instructions inserted are often associated with particular pre-existing instructions and must be executed every time that pre-existing instruction is executed, in some cases just before that pre-existing instruction is executed. Some of the references to instructions in preexisting object code file 1 will be offsets used to transfer program control to those points during execution. In this case the instruction offsets are adjusted to point to the beginning of the extra code associated with that pre-existing instruction. In other cases, such when a references points to data, even if extra data is inserted around a particular datum, the reference may still need to point directly to that datum. The data and instructions are generally treated as one section. References to both data and instructions are indexed from the beginning of the section containing the instructions and data. Data may be intermingled with instructions, as well. Expansion means 5 determines whether a particular value in the object file is a datum or an instruction, and also determines the purpose of each reference offset. Furthermore, compilers often put unnamed data, such as constants referred to in the source code, into the instruction section, but not inside a function. To differentiate this data from actual instructions a simplified dead-code analysis is used, starting from the named entry points specified by the symbols of type N_TEXT and the entry points derived from the instruction relocation structures. Any instructions that cannot be reached are considered to be data. One exception is that some object code libraries of at least one earlier Sun OS, 4.03, have several named entry points of type N_TEXT that are data, not entry points, and are therefore ignored for these purposes. The names of these data are "_BYADDR", "_NETGROUP", "_ypsleeptime", and "_ypserv_timeout". Another exception is that at least one compiler, gcc (from the Free Software Foundation), puts named constant data into the instruction section. If the object file was compiled by gcc, the first word of each named entry point is checked. If it is a link instruction, the entry point is considered a function; otherwise, data.

The instruction insertion process of expansion means 5 will now be described in detail with reference to FIGS. 2–4.

FIG. 2 shows a layout in storage media of a relocatable object file 1 containing a section 12 of instructions 12*a* and data 12*b*. Section 12 is copied into a block of memory allocated for the old object code table 20 (see FILES.C, "Initialize"). Each item in table 20 is indicated generally by a horizontal line, and the byte location for each item is shown to the left side (note: byte locations are shown in decimal); different items may have different lengths. Expansion means 5 allocates memory for other tables, shown in FIG. 3: a new object code table 30, a forward index table 40, forward control index table 50, and an inter-item offset table 60, described below. Then, starting at the beginning of the old object code table 20, each entry in table 20 is processed.

Figure 4:
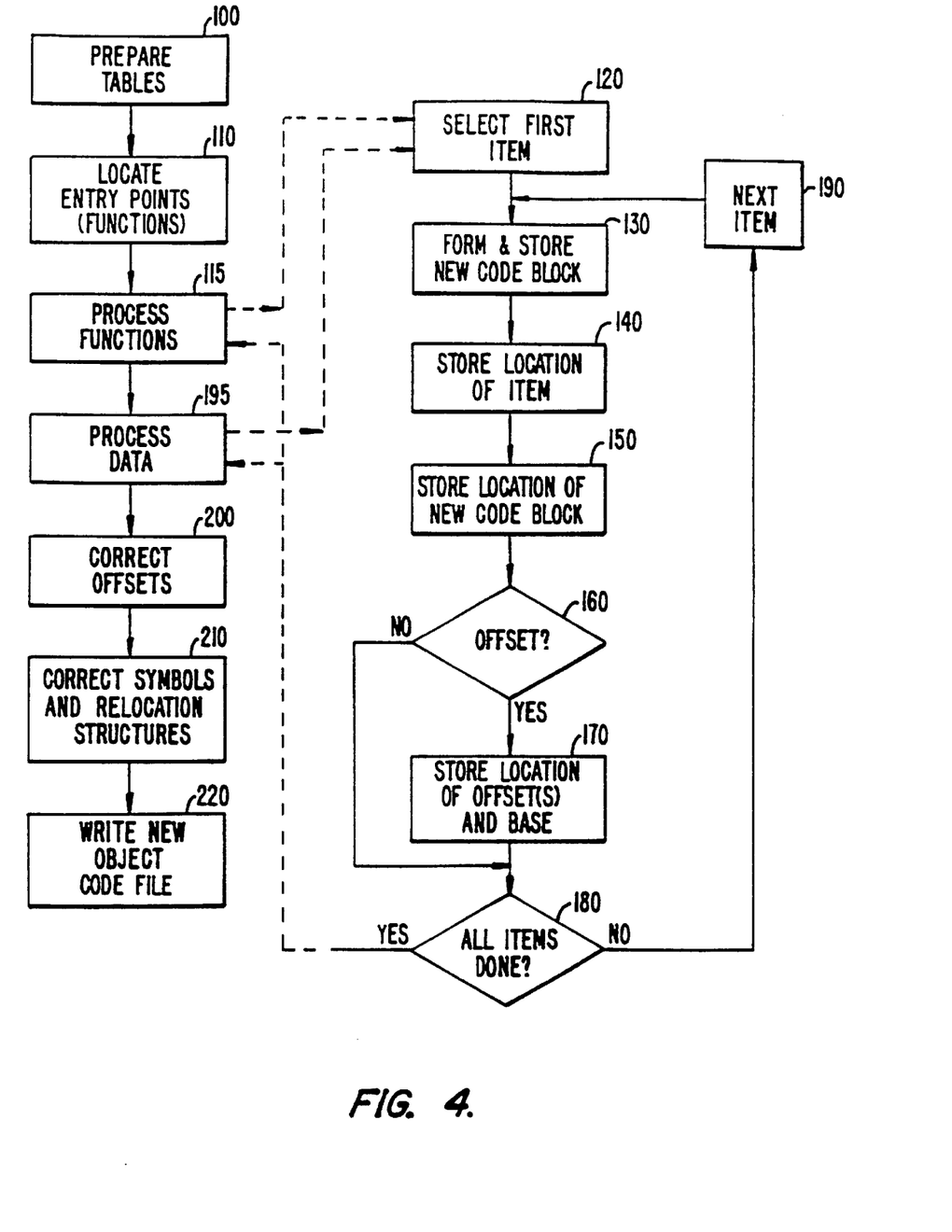
FIG. 4 is a flowchart of the general data/instruction insertion method.

FIG. 4 shows a general flowchart for the method performed by expansion means 5. Block 100 indicates the preparation of tables 20, 30, 40, 50 and 60, described above, and block 110 indicates the step of identifying entry points to functions (see INSERT.C, "FindFunctions"). Block 115 indicate the expansion of all functions; the details of the expansion process performed on each function are shown in the loop composed of blocks 120–190 (see INSERT.C, "DoOneFunction").

In step 120 of FIG. 4, the first item in the old object code table is selected. FIG. 3 shows parts of memory affected during steps 130 to 200 of the expansion process. Locations (bytes) 1 to 125 of table 20 have already been processed, and occupy locations 1 to 181 of new object code table 30. The next entry (an object code instruction within a function, indicated by its mnemonic "BEQ+6") at location 126 in old object code table 20 is then processed at step 130. This is a four byte instruction; it begins at location 126, and the next instruction begins at location 126+4=130 (decimal). Two opcode bytes are shown simply as BEQ, and the "6" is a two byte offset pointing to the "RTS" instruction beginning at location 132. Expansion means 5 forms a new code block 33 (see INSERT.C, "DoOneInstruction"), containing just the BEQ statement because no additional instructions or data are inserted. The offset is indicated by a question mark in table 30, because its new value is not yet known. Expansion means 5 allocates the maximum of four bytes for the offset, even though the original offset was only two bytes (and the BEQ opcode is slightly modified to correspond to a four byte offset). This is done because after expansion, the new offset might be too large for the number of bytes of the previous offset.

Figure 3:
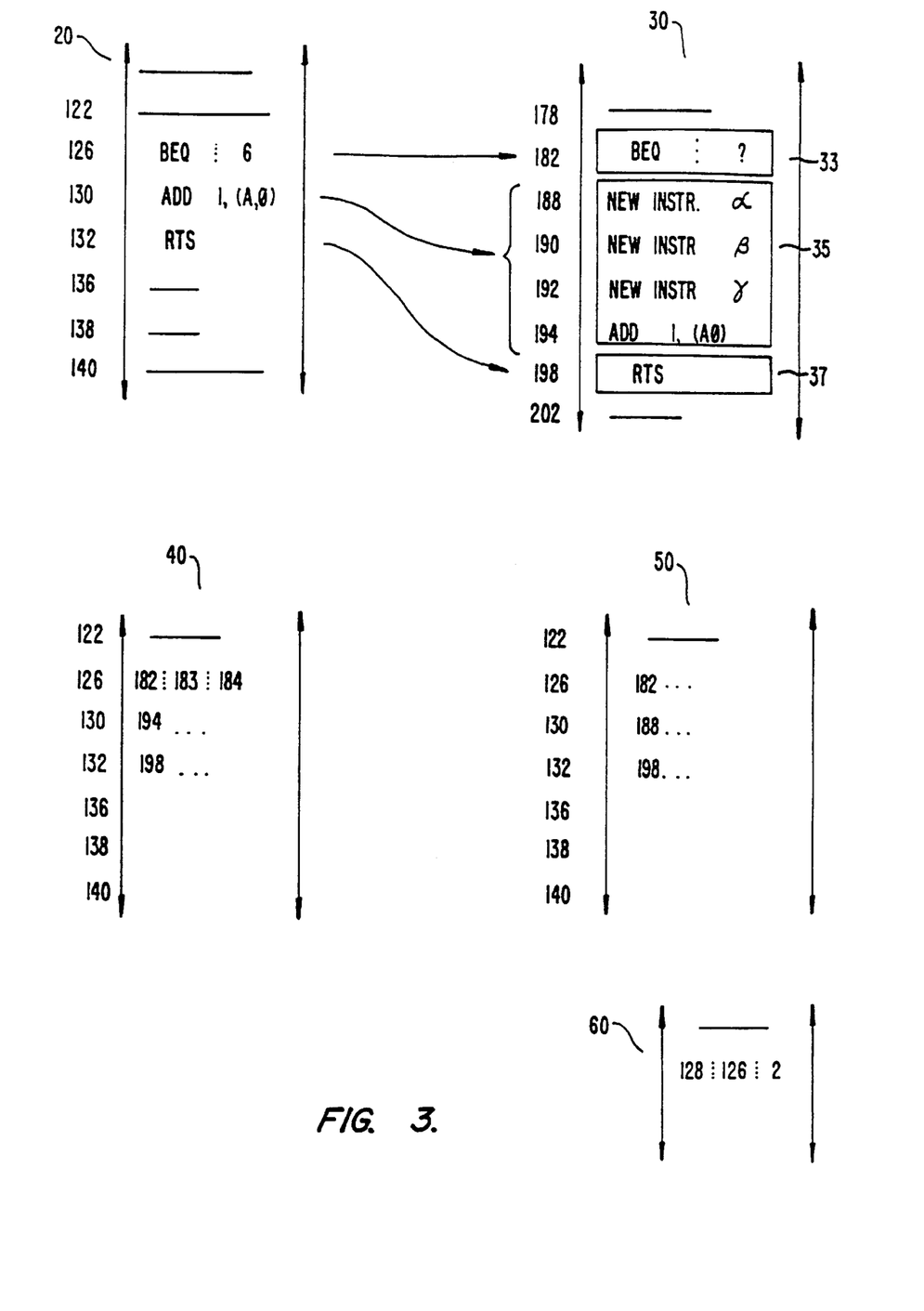
FIG. 3 illustrates the general data/instruction insertion method.

Referring to FIGS. 3 and 4 together, in step 140 the location of the BEQ instruction within new object code table 30 (location=182 ) is stored into location 126 of a forward index table 40. In general, the new location of each byte of an instruction is stored in table 40, but in this case, the only entries that are significant are at location 126 of table 40, which indicates that the BEQ statement now begins at location 182 of table 30, and location 128 of table 40, which indicates that the offset of the BEQ statement now begins at location 184 of table 30. The ellipses (". . . ") indicate that one or more values are present but have no significance. For example, location 129 of table 40 would correspond to the second byte of the BEQ offset, at location 129 to table 20; however, the offset gets expanded from two bytes to four, so the individual bytes of the offset cannot be indexed separately.

Next, in step 150, the location of new code block 33 (location=182 ) is stored in forward index control table 50. Even though there is space for the new locations for each byte of the BEQ 6 statement, only the location of the beginning of the statement is significant. Note that in some expansion schemes, the preexisting instruction might always be located at the beginning of the new code block, in which case the same information would be recorded in both forward index table 40 and in forward control index table 50; dual recordation of this information would, however, be a waste of space. The best approach, therefore, envisions a forward table which, as explained above, may or may not need to include the two separate sub-tables, forward index table 40 and forward control index table 50.

Next, in step 160, expansion means 5 determines that this instruction contains an inter-item offset (an inter-item offset is a reference to an instruction or datum expressed in terms of its distance in bytes from a second instruction or datum). This determination is made by examining the opcode of the instruction (see INSERT.C, "RecordPcRelInstr"). Since this instruction contains an inter-item offset, step 170 is performed, whereby the old location of the offset (128 in table 20), the old location of the base from which the offset was measured (126 in table 20), and the old size of the offset (2 bytes) are all stored in inter-item offset table 60. For any instruction which denotes the beginning of a switch table of inter-item offsets, each offset is stored in table 60 as above, with the beginning of the switch table entered as the base (see INSERT.C, "DoSwitchTable"). In step 180 the loop is repeated if any unprocessed items remain. Since there are still more unprocessed items in table 20, step 190 selects the next item, "Add 1,(A0)", and the loop is begun again at step 130.

Repeating steps 130–180, expansion means 5 forms a new code block 35 from the add instruction and new instructions α, β, and γ, which in this particular case precede the add instruction. This new code block is stored at location 188 of new object code table 30, with the add instruction located at location 194. The location of the add instruction within new object code table 30 (location=194) is stored into location 130 of a forward index table 40. This indicates that the item which was in location 130 of old object code table 20 is now in location 194 of new object code table 30. The location of new code block 35 within new object code table 30 (location=188) is stored in location 130 of forward control index table 50. This indicates that the new code block formed from the item located at entry 130 of old object code table 20 is located at entry 188 of new object code table 30. The add instruction does not contain an inter-item offset, so nothing is entered into table 60.

Now this cycle is repeated for the next item in old object code table 20, "RTS" (return from subroutine) at location 132. A new code block 37 is formed, but it is determined that there are no new instructions to be inserted with the return instruction, so new code block 37 consists only of the return instruction. New code block 37 is stored at the next available location within new object code table 30, location 198. The location of the return instruction within new object code table 30 is stored into location 132 of forward index table 40; the location of new code block 37 within new object code table 30 is stored in location 132 of forward control index table 50. Since the return instruction and new code block 37 are the same, the number 198 gets stored into location 132 of both index tables. In this example, the return instruction does not contain an inter-item offset, so nothing is stored in inter-item offset table 60. Unnamed constant data is sometimes stored in between functions, after the last instruction of a function and before the next entry point; it may be processed as desired or simply copied directly into the new object code table.

After steps 120–190 have been done for all items in all functions, step 195 repeats the expansion process of blocks 120–190 for all named data. The expansion process is somewhat simpler for data because it does not contain any offsets such as handled by blocks 160–170. Next, in step 200, expansion means 5 corrects the inter-item offsets (see PATCH.C, "PatchPcRel"). The inter-item offset table is examined, and for each set of offset/base locations in that table, the inter-item offset is patched by: first, adding the indicated offset to its base to determine which item in old object code table 20 was targeted by the offset; next, looking up the new location of the targeted item, using forward control index table 50 if the offset is used for program control transfer (such as a jump or call), and using forward index table 40 otherwise; also, looking up the new locations of the offset and base, using forward index table 40; and, finally, patching the offset in new object code table 30 with the difference between the new location of the targeted item and the new location of the base.

In this particular example, step 200 involves the offset/base pair of 128/126. The offset is looked up at location 128 in table 20, where the value 6 is found. This is added to the base of 126 to yield a target location of 132. Because this offset is used in a program control transfer statement (branch), the new target location is looked up in table 50, which provides a new target location of 198. The new offset and base locations are looked up in table 40, providing a new base location of 182 and a new offset location of 184. The difference of 198 minus 182, 16, is then stored at the new offset location, 184. This process is repeated for all entries in table 60.

Next, if the object file contains any symbol tables or relocation tables which are to be corrected, these are analyzed item by item in step 210, and corrected by replacing old item locations with new item locations, as explained above (see also PATCH.C, "PatchTextReloc" and "PatchdataReloc"). The new item locations are looked up in forward index table 40 (except for debugging symbols, the new locations for which are looked up in forward control index table 50). A new object code file 1' is now written, using the new object code table as the data/instruction section, using the new symbol and relocation tables if corrected, and using the remaining information from the old object file 1.

Memory Access Monitoring

This aspect of the invention is directed to a process of tracking reads and writes of memory by an application program. In the preferred embodiment, all object files of the application program are processed by a memory monitor equipping program that uses the above described expansion means and data/instruction insertion process to insert a function call before every instruction that includes a memory access, and before some instructions that change the stack pointer. All of substantially all of the memory accesses of a given program (not including the memory accesses for instruction fetch) are thereby monitored, for the purposes of performing error checking. All of the object code files for an executable program are processed (except for a library of routines to be added by the memory monitor equipping program), and instructions are added to implement the monitoring scheme described below.

Figure 5:
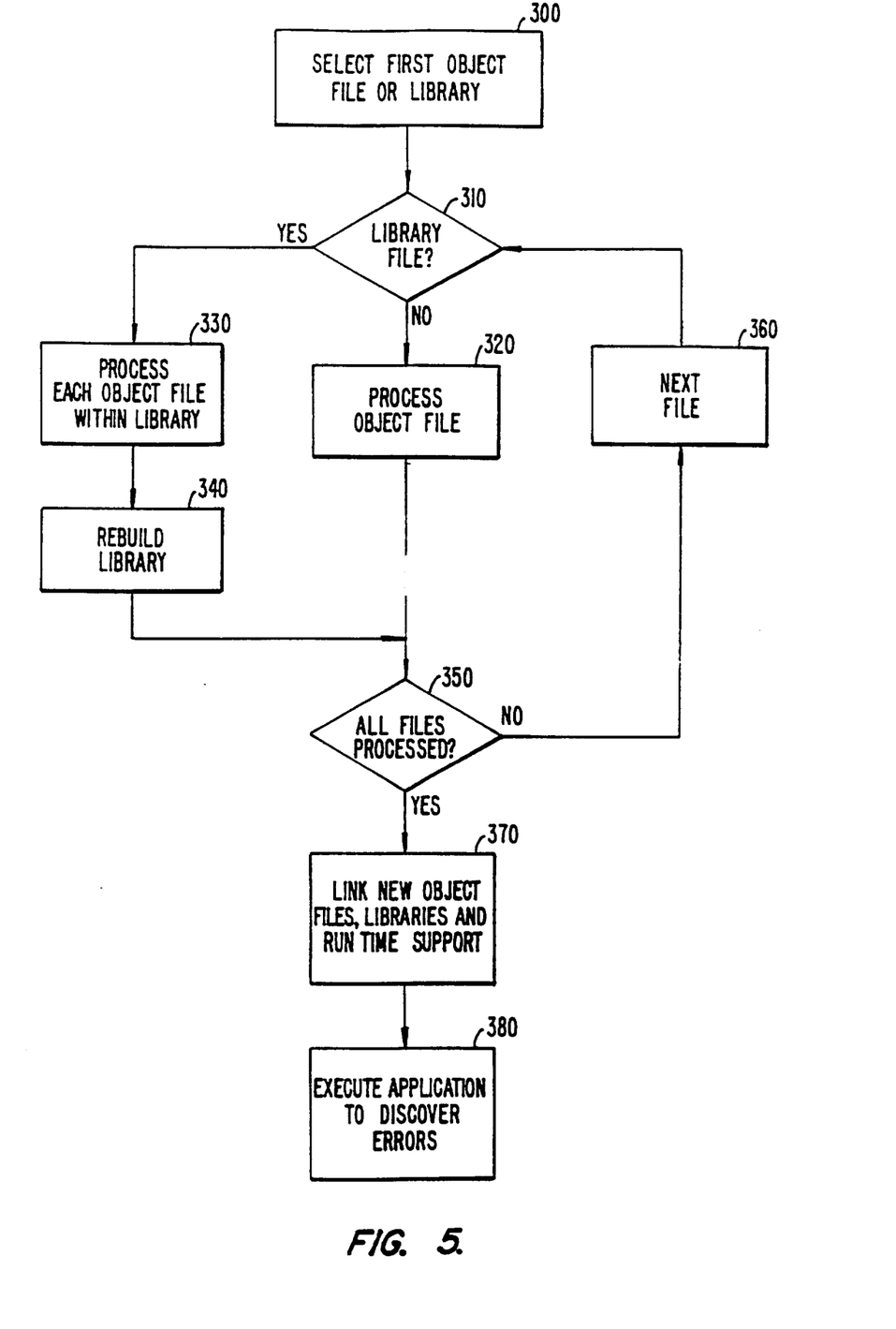
FIG. 5 illustrates the general procedure for implementing a monitoring scheme by modifying the object files for an executable program.

The general procedure of implementing a monitoring scheme to discover errors in an executable program, by modifying all of the object code files for the executable program, linking the modified program and then running it, is illustrated in FIG. 5. A first object file or library for the executable program is selected in block 300. If the file is determined to be a simple object file rather than a library, in block 310, then the object file is processed in block 320 to implement a monitoring scheme, by the expansion process described above; also, functions within the object file may be renamed, as described below. If the file is determined to be library in block 310, then each object file that contributes to the library is processed in block 330, in the same manner that a simple object file is processed by block 320. Then, in block 340, the library is rebuilt from the modified object files. After the object file or library has been processed, block 350 determines if any unprocessed files remain for the executable file. If so, block 360 selects an unprocessed file and then the steps of blocks 310–350 are repeated. Once it is determined in block 350 that all files for the original executable program have been processed, all necessary linkage is performed in block 370, which may include linkage with an extra library file including functions specially designed for the monitoring scheme. The program is then executed in block 380; during this execution, the monitoring added by the expansion process is performed.

Figure 6:
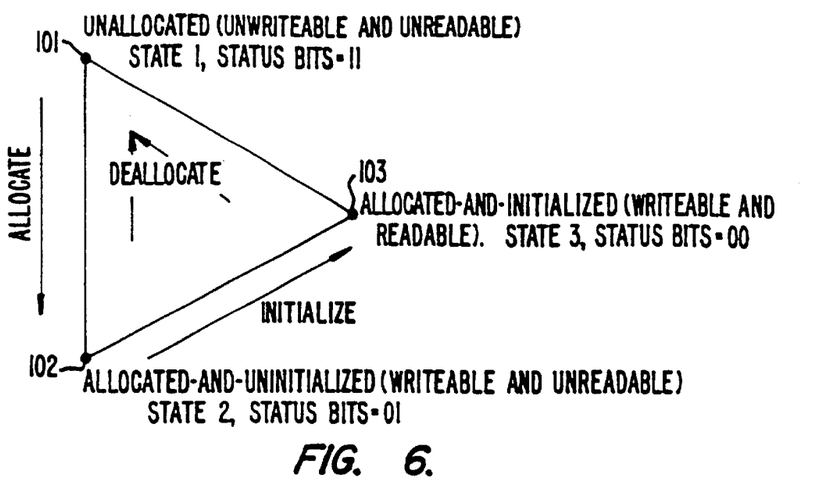
FIG. 6 illustrates the different memory access states used in a particular embodiment of the invention directed to tracking memory access of a program.

In the memory access monitoring method of the preferred embodiment, the expanded code establishes a memory status array with an entry for most memory locations validly accessible by the program, in which two-bit array entries are allocated for each such memory location. Each entry indicates the state of the corresponding memory location, and the state can be one of the following three: (1) unallocated and uninitialized (status bits=11); (2) allocated and uninitialized (status bits=01); and (3) allocated and initialized (status bits=00). Before each preexisting instruction that accesses memory or that can change memory status, extra instructions are added to maintain the memory status array, and to use the memory status array to check for the errors of writing to unallocated memory and reading from uninitialized or unallocated memory. A state transition diagram is shown in FIG. 6, which illustrates the three states a memory location can have, and how states are changed. State (1) is indicated by reference numeral 101; state (2), 102; and state (3), 103. The first bit of a status code indicates whether the memory location is unallocated; the second bit indicates whether the memory location is uninitialized. Memory locations in state 1 are unwriteable and unreadable; those in state 2 are writable but unreadable; and those in state 3 are writable and readable.

The status codes generally begin as 11 (state 1, unallocated), and during execution of the modified application program, change as follows: on a successful call to "malloc" (a c memory allocation routine), the status bits for each byte are set to 01; on a successful call to "free", the status bits for each byte are set to 11; on a successful call to "realloc", the status bits for the old memory are set to 11, and for the new, to 01 (the bits for that part of the new memory that is initialized from the old memory is set to 00). When the stack pointer is decremented, the status bits for the bytes on the stack now allocated are set to 01. When a byte is about to be written, the first bit of its status bits is checked—if the bit is set, an error is signalled, else the readable bit is cleared (since the byte will now be initialized). Similarly, when a byte is about to be read, the second bit of its status bits is checked—if the bit is set, an error is signalled. As a special case, when a byte is about to be copied from one memory location to another, the read of uninitialized memory is allowed, but the destination is marked as uninitialized, so that a copy operation on a structure with uninitialized bytes such as those from compiler padding will not cause an error to be signalled. In the preferred embodiment, status checking and changing is handled by a group of specialized runtime functions which are called at the appropriate points.

Figure 7:
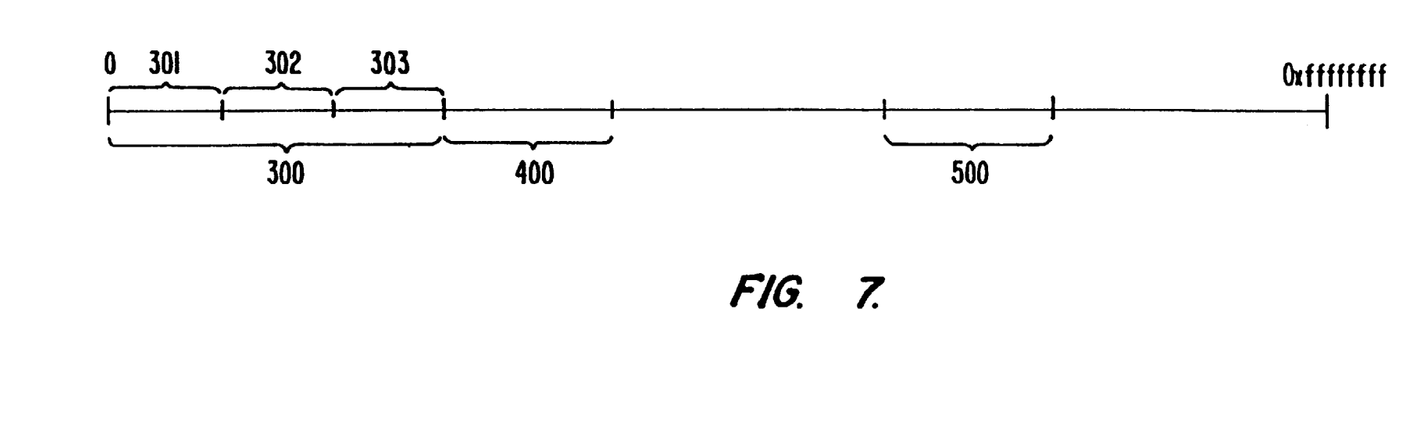
FIG. 7 is a virtual memory map showing the portions of virtual memory available to a program.

FIG. 7 represents the entire 32-bit virtual address space and is not to scale. The memory region 300 at the bottom of the address space, which corresponds to the static information in the program, begins and remains in State 3. Memory region 300 contains the instruction codes 301, the data 302, and the BSS data 303 (data loader-initialized to zero). The bytes in heap 400, which are manipulated via the malloc, realloc, and free functions, change state frequently. This memory is in State 1 to start, then goes to State 2 when it is malloc'd, and to State 3 once it has been written; it goes back to State 1 when it has been freed. Memory region 500 is available to the stack. Memory 500 is in State 1 if it is below the stack pointer. As the stack pointer moves down, parts of this memory become "allocated", and are in State 2. Once the stack is written to the status goes to State 3. As the stack pointer moves up, it goes back to State 1. It is possible to treat every movement of the stack pointer as an allocation or deallocation, and to call the same routines as are called for malloc and free. This causes significant performance degradation, however, because the stack pointer changes frequently. A simplified way to track the status of memory in this region with less status bit maintenance is to compare the location of the referenced memory to the stack pointer. Memory in this region and above the stack pointer is looked up in the status bit table; memory in this region and below the stack pointer is considered to be in state 1. The method of stack pointer handling by the preferred embodiment is: (a) On entry to a function, where a link instruction allocates stack space for the function's local variables, a call is inserted to mark this affected memory as state 2. (b) When an argument is pushed onto the stack, a call is inserted to mark the affected memory as state 3. (c) When the stack pointer is incremented (reclaiming stack space) nothing is done. This is tied to the method for looking up the status bits for a given byte, which employs the rule, "if the byte is on the stack, but below the stack pointer, then ignore the bit table, and use the state 1 (unallocated) bits." (d) Calls to "alloca" are handled specially, and the affected memory is set to status 2.

There is an additional complication for stack variables. optimizing compilers rearrange code to increase performance; one of the optimizations that they make is to move simple assignments out of loops. Sometimes this can result in an uninitialized stack variable being accessed, but, the result is not used. Unfortunately, a monitored program would not determine that the result is not used, and would signal an error. Such unnecessary signalling of errors is avoided by inhibiting uninitialized stack variable checks in optimized code by marking local variables in the optimized stack-frame as initialized (i.e., in state 3).

The status bits for the memory from 0 to the top of heap 400 are kept in a first bit-array; the status bits for stack memory 500 are kept in a second bit-array. Virtual memory outside of memory regions 300, 400, and 500 is obtained for storing these bit arrays using the "mmap" system call. To locate the status bits for an arbitrary byte at an address, the method is: if the address is below the top of heap 400, then the bit index is 2 times the address; if the address is in stack memory region 500, then the bit index is the address minus address of the bottom of stack region 500, then times 2; otherwise, the address must be a special address, such as shared memory, and is ignored.

The current state of a memory location could be indicated without the use of status arrays. The value stored at a memory location would indicate the status of that location. One particular value would represent the unallocated state (state 1), another particular value would represent the allocated and uninitialized state (state 2), and all other values would represent user data in state 3. Obviously, however, single-byte values to not have a significant range, so the values representing states 1 and 2 would often occur in valid user data, causing errors to be incorrectly signalled. This problem could be minimized by using two or four byte sequences to indicate memory status, reducing the odds of random occurrence, but then single-byte access checking would not be easily supported. For this reason, the use of one or more separate status arrays is believed to be preferable.

The code for operating system routines does not get linked into the user's program. This code is thus not available to be processed according to the invention, and the memory status monitoring code cannot be inserted. For this reason the monitor process must take special measures to track system calls in which the operating system accesses the program's memory directly. The same special measures are also taken to track the heap management functions "malloc", "free", and "realloc".

Figure 8:
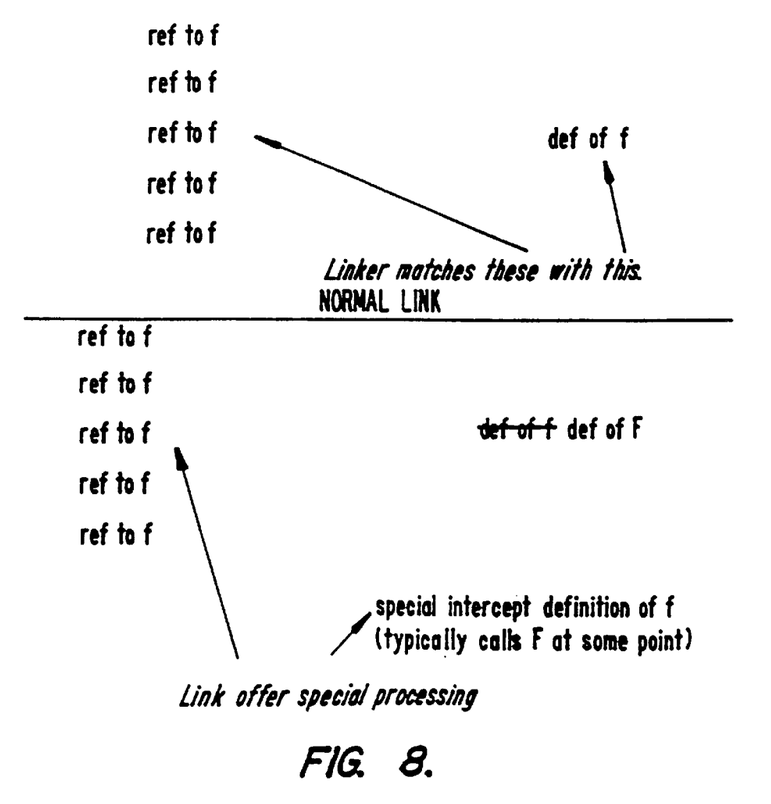
FIG. 8 illustrates how calls to operating system routines are handled under an embodiment of the invention directed to memory access monitoring.
Figure 9:
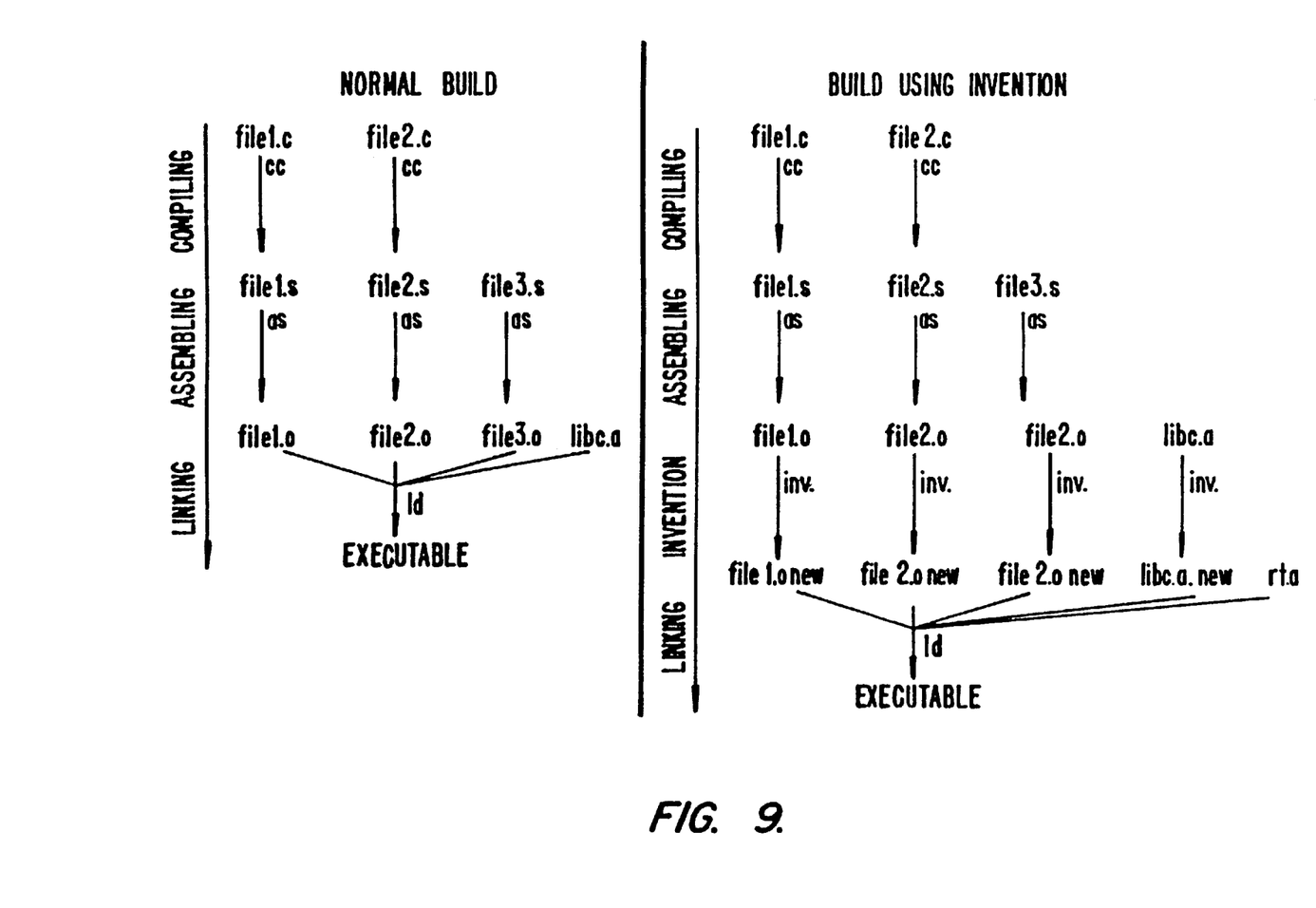
FIG. 9 illustrates how the object files for an executable program are processed by an embodiment of the invention directed to memory access monitoring.

These special measures are shown in FIG. 8, which shows a process for intercepting all of the calls to a given set of functions, by modifying the name of every definition (usually there is only one) of these functions, and replacing their old names with new names. Interceptor functions are then provided under the old names; these interceptor functions typically call the intercepted functions as well as having other code. Given a function name, f, and its desired replacement, F, which must not have a longer string length than f, each object file is scanned for external symbols (types N_TEXT and N_EXT) named f. For any such instances, the name F is written over the name f. When the linker runs, the only definition of f will be the interceptor function, and when the program runs the interceptor function f will be called in place of the original f, which has been renamed F. To support the name of F being longer than f, the string table may copied and extended, and then all of the old references, which are in the symbol section, are patched into the new string table.

In the preferred embodiment the data sections of the object code files are expanded with extra dummy entries between each datum or array of data. These extra entries are assigned the status of unallocated and uninitialized, and aid in the detection of array bounds violations and similar data errors. The preferred embodiment also establishes a list of memory or datum locations which are to be watchpoints with which more comprehensive monitoring is to be performed. These additional aspects of the preferred embodiment are described in more detail below.

In order to detect many array bounds violations, 8 bytes of memory are allocated before and after each array in the heap, data and bss segments. These 8 bytes are marked as State 1 (unallocated) so that if the program accesses off the end of an array, it will access State 1 memory, and trigger the signalling of an error. For heap arrays, the status bits are set when the array is allocated. For statically allocated arrays, a special 8 byte value (unlikely to be encountered randomly) is inserted between each statically allocated datum. When the monitored program starts execution, the statically allocated memory is searched for occurrences of the 8 byte value. The status bits for each such occurrence are set to state 1. The error signalling routine looks for the special 8 byte values to print more informative messages ("Array bound violation," in place of "memory access violation"). Stack arrays are not currently delimited with the 8 byte markers, although they could be if so desired.

There are some further complications with this method of tracking arrays, however. occasionally, either the compiler or the programmer computes the address of the end of an array and uses it as an upper-limit pointer. If the array is defined in the same file upper-limit pointer is used, then the relocation information provided by the compiler is identical to that provided for a reference to the beginning of the next array. In general, any link-time reference to an address between two data could be intended as either to the end of the first datum or to the beginning of the second. When the data are separated, as described in the preceding paragraph, those two points will no longer be identical. Almost always, the reference is to the beginning of the second, and that assumption can be made. It is possible to implement a check to determine if the reference is used solely as an upper-limit pointer or not, and have the reference patched accordingly. Another alternative is to allow the programmer to suppress the insertion of the 8 byte data separator in files that use an upper-limit pointer for locally defined arrays.

Watchpoints are implemented by setting the read and write status bits of the bytes to be watched to 11 (binary) and by adding the location of the watchpoint to a watchpoint list. When the error signalling routine is called, the address being checked is compared against the list of current watchpoints. If there is not a match, the error signalling routine continues normally. If there is a match, then the status bits to be manipulated are in a watchpoint-specific data structure, and the error routine calls the watchpoint routine, which typically prints a message, and returns without signalling an error.

The above described memory access monitoring of the preferred embodiment is implemented by the methods illustrated in FIGS. 4 and 5, wherein the formation of new code blocks, step 130 of FIG. 4, is performed according to the method described hereinbelow with reference to FIG. 10, and wherein function definitions of operating system routines that access memory are intercepted as described above. Also, the original initial entry point to the program is redefined to point to monitoring setup code, which when finished, transfers to the original initial entry point. The monitoring setup code is thus the first code executed in the modified executable program, and establishes the memory status arrays.

Figure 10:
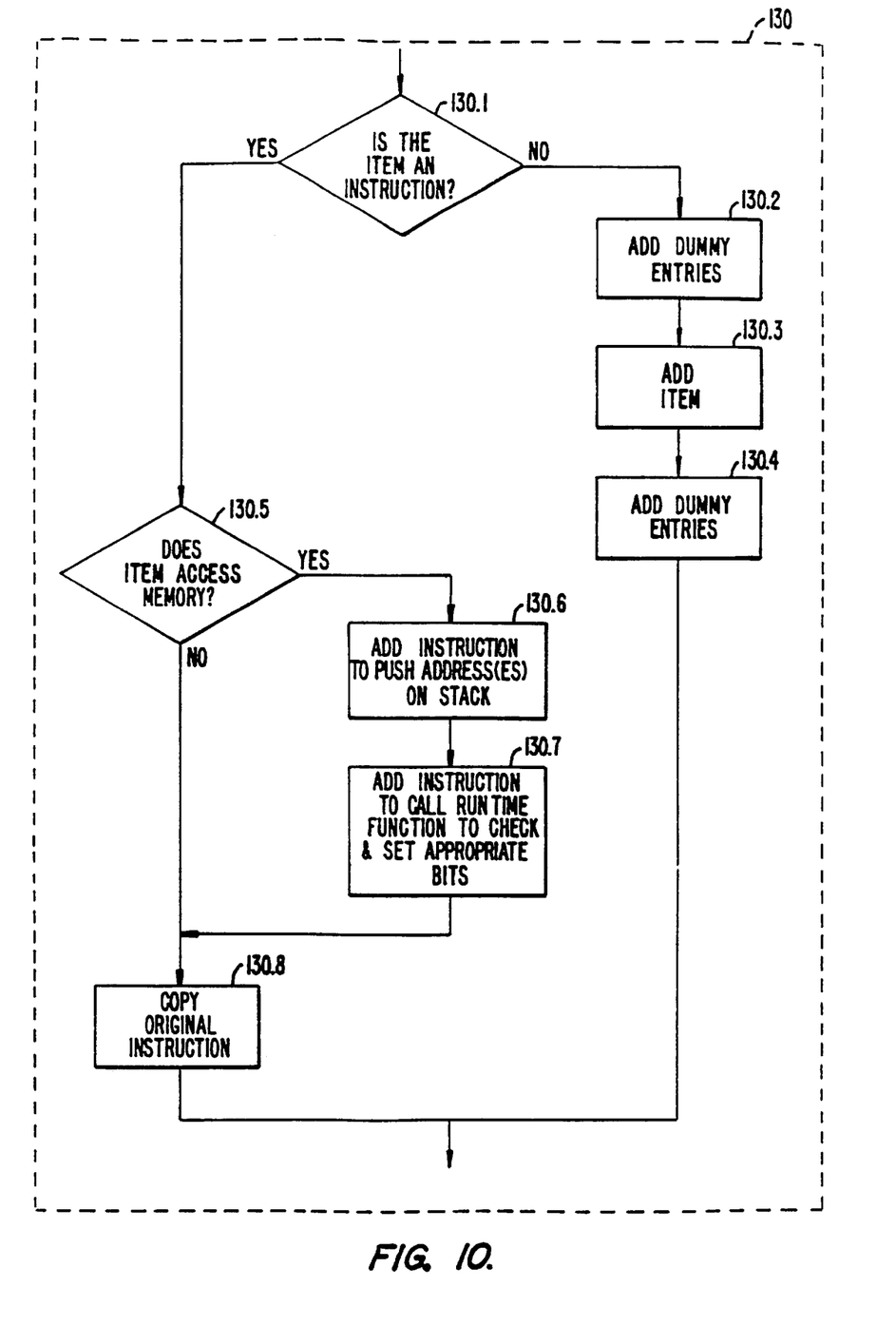
FIG. 10 illustrates the formation of new code blocks to implement the memory access monitoring of the preferred embodiment.

Referring to FIG. 10, for this formation of new code blocks, block 130.1 determines the processing of the item according to whether it is an instruction (part of a function) or a datum. If it is a datum, blocks 130.2 to 130.4 copy the datum into the new code block with a dummy entry before and after, to enable the array bounds checking described above. For instructions, it is determined in block 130.5 if they access memory. If so, block 130.6 adds an instruction to push onto the stack the memory address(es) to be accessed, and block 130.7 adds a call to the appropriate special runtime function that will check and set the appropriate status bits as well as signal errors and handle watchpoints. Finally, in block 130.8, the item itself (the preexisting original instruction) is copied into the new object code table, and the procedure of new code block formation step 130 is completed. The remainder of the method of modifying the executable program and monitoring its execution is as described above with reference to FIGS. 4 and 5.

Alternative Embodiments

Rather than being added through object code processing, the instructions used to implement monitoring could be added in a compiler based or precompiler based manner, both of which have some advantages and significant disadvantages, however. A compiler normally generates during compilation all the necessary information to implement this monitoring; what is lacking, basically, is for the compiler to add extra code as illustrated in FIG. 10. The disadvantages of this approach are that recompilation for error checking consumes much more time than the above described object code processing, and that source code access to all involved libraries is necessary to ensure comprehensive and accurate error checking. A precompiler based approach, which would insert extra source code statements into source code files, would suffer all of the disadvantages of a compiler based approach, although it would have portability advantages.

Yet another alternative approach would be for the invention to add the monitoring code directly into a previously linked program. Since an executable program has the same basic format as a relocatable object file, the program could be processed as one large object file. This would entail a more involved dead code analysis to distinguish data from instructions, and there would be both relative and absolute addresses to be updated rather than just relative addresses (offsets).

It is to be understood that the above description is intended to be illustrative and not restrictive. Many other embodiments will be apparent to those of skill in the art upon reviewing the above description. For instance, provisions for shared memory could be made, such as with yet another bit table, but the bit tables should then also be shared, and all programs which access the shared memory should correctly maintain the status codes. Also, another example of a monitoring scheme especially suitable for implementation through the above object code expansion would be standard profiling. The scope of the invention should, therefore, be determined with reference to the appended claims, along with the full scope of equivalents to which such claims are entitled.

What is claimed is:

1. A computer program product stored on a computer readable medium that stores computer codes for equipping a computer program with an interceptor function for being executed in place of an intercepted function, said computer program having a plurality of object code files including a first object code file containing a definition of said intercepted function and a second object code file including a first structure identifying said intercepted function definition by an original intercepted function name, said computer program product comprising:

computer code that modifies said first structure to identify said intercepted function definition by a modified intercepted function name, whereby a modified second object code file is produced;

computer code that provides a third object code file containing a definition of said interceptor function and a second structure identifying said interceptor function definition by said original intercepted function name; and computer code that links at least said modified first object code file, said second object code file and said third object code file to produce a modified computer program whereby a first call causes execution of said interceptor function.

2. The computer program product for equipping a computer program with an interceptor function for being executed in place of an intercepted function as recited in claim 1, further including computer code that examines said plurality of object code files to identify said first object code file, and wherein said computer code that modifies said second object code file is responsive to said computer code that examines said plurality of object code files.

3. The computer program product for equipping a computer program with an interceptor function for being executed in place of an intercepted function as recited in claim 1, wherein said computer code that modifies said first structure comprises computer code that transforms at least one character of said original intercepted function name.

4. The computer program product for equipping a computer program with an interceptor function for being executed in place of an intercepted function as recited in claim 3, wherein said computer code that modifies said first structure comprises computer code that changes case of at least one character of said original intercepted function name.

5. The computer program product for equipping a computer program with an interceptor function for being executed in place of an intercepted function as recited in claim 1, wherein said computer code that provides a third object code file containing a definition of said interceptor function comprises a call from said interceptor function to a function identified by said modified intercepted function name, whereby execution of said interceptor function results in execution of said intercepted function.

* * * * *